United States Patent
Kesil et al.

(10) Patent No.: US 10,099,384 B1
(45) Date of Patent: Oct. 16, 2018

(54) INDUSTRIAL WEDGE-TYPE GRIPPER MECHANISM

(71) Applicants: Boris Kesil, Santa Clara, CA (US); Elik Gershenzon, Santa Clara, CA (US)

(72) Inventors: Boris Kesil, Santa Clara, CA (US); Elik Gershenzon, Santa Clara, CA (US)

(73) Assignee: Quartet Medtronics Inc, Santa Clara, CA (US)

( * ) Notice: Subject to any disclaimer, the term of this patent is extended or adjusted under 35 U.S.C. 154(b) by 0 days.

(21) Appl. No.: 15/721,827

(22) Filed: Sep. 30, 2017

(51) Int. Cl.
  *B25J 15/00* (2006.01)
  *B25J 15/02* (2006.01)

(52) U.S. Cl.
  CPC ....... *B25J 15/0023* (2013.01); *B25J 15/0028* (2013.01)

(58) Field of Classification Search
  CPC .................................................. B25J 15/0023
  USPC ................................................. 294/207, 192
  See application file for complete search history.

(56) References Cited

U.S. PATENT DOCUMENTS

| | | | | |
|---|---|---|---|---|
| 3,655,232 A | * | 4/1972 | Martelee | B66C 1/32 294/119.1 |
| 4,453,757 A | | 6/1984 | Soraoka et al. | |
| 4,729,588 A | * | 3/1988 | Kratzer | B25J 15/028 294/115 |
| 4,892,344 A | * | 1/1990 | Takada | B25J 15/0266 294/119.1 |
| 4,913,481 A | * | 4/1990 | Chin | B25J 15/028 294/119.1 |
| 5,762,391 A | | 6/1998 | Sumnitsch | |
| 6,318,779 B1 | * | 11/2001 | Hanne | B25B 5/061 294/119.1 |
| 6,494,516 B1 | * | 12/2002 | Bertini | B23P 19/084 294/119.1 |
| 6,777,903 B1 | | 8/2004 | Ostwald | |
| 7,014,235 B1 | | 3/2006 | Ostwald | |
| 8,585,113 B2 | * | 11/2013 | Maffeis | B25J 15/0253 294/192 |
| 2005/0093318 A1 | * | 5/2005 | Bellandi | B25B 5/061 294/207 |
| 2009/0212582 A1 | * | 8/2009 | Maffeis | B25B 5/122 294/207 |
| 2013/0334831 A1 | * | 12/2013 | Maffeis | B25J 15/0028 294/207 |

* cited by examiner

*Primary Examiner* — Paul T Chin

(57) ABSTRACT

An industrial wedge-type gripper mechanism for gripping or releasing objects that has a housing with a piston of a pneumatic cylinder moveable in the housing in longitudinal direction of the housing and a plurality of gripper jaw holders that slide in the housing in a radial or transverse direction and that support the gripper jaws. The gripper jaw holders have inclined slots, and the piston of the pneumatic cylinder is associated with a member that supports rolling bearings rolling and sliding in the inclined slots so that with reciprocations of the piston the rolling bearings exert a camming or wedging action on the walls of the inclined slots and thus cause the gripper jaw holders and thus the gripper jaws to perform gripping or releasing action on the objects.

15 Claims, 4 Drawing Sheets

US 10,099,384 B1

INDUSTRIAL WEDGE-TYPE GRIPPER MECHANISM

FIELD OF THE INVENTION

The present invention relates to industrial gripper mechanisms and more particularly to robotic gripper mechanisms with improved wedge-type actuator for the gripping action. More specifically, the invention relates to a gripper for disk-shaped articles with at least a roughly circular outside periphery with gripping jaws which are guided to move radially to the inside and to the outside relative to the outer periphery of the disk-shaped article or the inner periphery of a central hole in a disk-shaped article.

DESCRIPTION OF PRIOR ART

In practice, there often arises a problem of grasping disk-shaped articles such that neither the top nor the bottom of the disk-shaped article is touched, that therefore the disk-shaped article is grasped and held only on its outside periphery (outer edge) or the inner periphery of a central hole. This problem arises for example in the handling of silicon wafers, with surfaces which may not be touched when the wafer is held by a gripper.

For example, U.S. Pat. No. 4,453,757 describes a robotic gripper having the spreading mechanism as a part which can twist in a base body and which is raised and lowered relative to the base body during twisting as a result of the grooves which are provided in its outer periphery and which interact with guide rollers located in the base body. To actuate the gripping claws there are other grooves which have a changing depth so that when the cylindrical part is turned opposite to the base body the gripping claws can be adjusted radially to the base body.

This combination of two movements which are aligned perpendicularly to one another (radial adjustment and raising and lowering) is of great importance for the grippers of U.S. Pat. No. 4,453,757, since in this way the gripping claws are to be prevented from rubbing against the bottom of the wafer when it is grasped.

An attempt has been made to improve the gripper mechanism by providing the gripper of U.S. Pat. No. 4,453,757 with an improved actuation mechanism of a gripping action. This mechanism is described in U.S. Pat. No. 5,762,391. The aforementioned gripper assembly has gripper fingers, which are mounted so that they can be guided and moved radially inward and outward relative to the main body of the assembly. The gripper fingers are biased radially inward by springs. Fitted in the main body (is a finger-opening device with a conical body, which moves the fingers radially outward together against the action of the springs. If the finger-opening device is then retracted, at least some of the fingers come to rest against the edge of the disc-shaped article. If the device is retracted further, the remaining fingers also come to rest, under the action of their associated springs, against the edge of the disc-shaped article. The conical body in the finger-opening device acts on the fingers via guiding elements fitted inside the main body and connected to the fingers by guiding rods.

A disadvantage of such a gripper mechanism is that it has a one-sided gripping action since the return of the grippers into the initial position is carried out by the spring. The mechanism cannot provide sufficient rigidity, high and a controllable gripping force, and an accurate precision movement of the gripping jaws.

SUMMARY OF THE INVENTION

The industrial wedge-type gripper mechanism of the present invention eliminates drawbacks of the existing mechanisms of this type and provides a two-directional rigid, strong, and accurate gripping action on an object from outside or inside thereof thus performing radial outward or radial inward motion of the gripping jaws.

The gripping mechanism has a housing that contains a fluid cylinder, e.g., a pneumatic cylinder with a piston having a piston rod which supports a rolling-bearing carrier with a plurality of rolling bearings, e.g., ball bearings, fitted with their inner rings on axles that are secured on the rolling-bearing carrier and are arranged at equal angular distances from each other. The bearings are slidingly inserted with their outer rings into inclined slots formed in gripper holders, which, in turn, are guided in radial slots of the housing. The outer end faces of the gripper holders support gripper jaws, which project from the housing and are intended to grip the objects to be treated.

In operation, when compressed air is supplied into the under-piston cavity, the piston goes up together with the bearings which exert a wedging or camming action onto the wall surfaces of the respective inclined slots of the gripper holders. As a result, the gripper holders, and hence the gripper jaws, slide in the outward radial direction in the housing thus moving the gripper jaws in the same direction relative to the engagement surface of the handled object (in this case, relative to the surface of the central hole of the object).

When the piston assumes its position for the movement in the downward direction, the compressed air is supplied to the over-piston cavity, the piston moves down, and the bearings, which also move down, exert the wedging or camming action on the inner surface of the inclined slots in the gripper holders and push them in the radial inward direction.

DETAILED DESCRIPTION OF THE INVENTION

The present invention relates to industrial gripper mechanisms and more particularly to robotic gripper mechanisms with an improved wedge-type actuator for the gripping action. More specifically, the invention relates to a gripper for disk-shaped objects with at least a roughly circular outside periphery with gripping jaws, which are guided to move radially to the inside and to the outside relative to the outer periphery of the disk-shaped article or a central hole of a disk-shaped object.

The industrial wedge-type gripper mechanism of the present invention eliminates drawbacks of the existing mechanisms of this type and provides a two-directional rigid, strong, and accurate gripping action for gripping circular objects from outside and inside by radial outward or radial inward motion of the gripping jaws.

Figure 1:
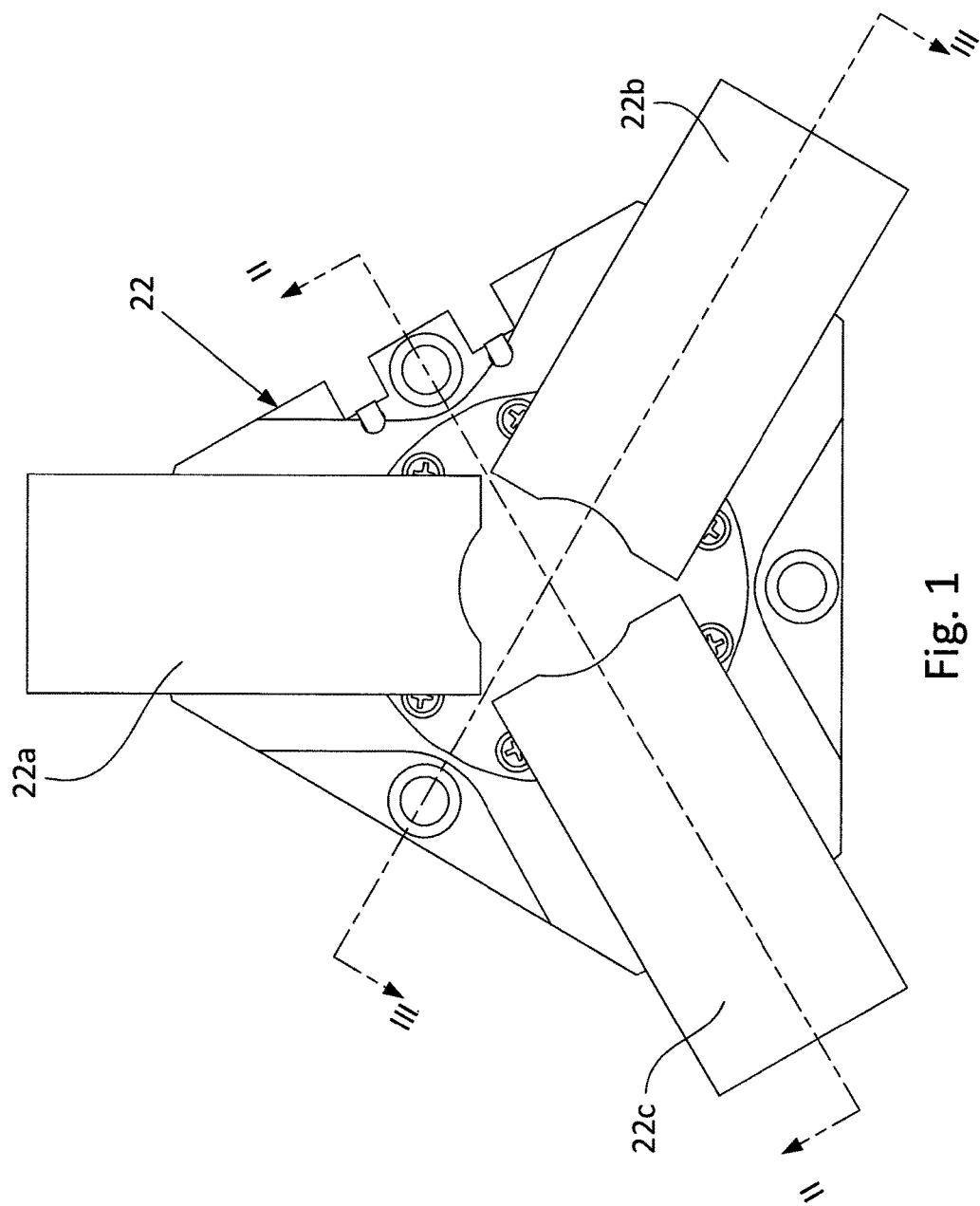
FIG. 1 is a top view of the industrial gripper mechanism of the present invention shown without the gripper jaws.
Figure 2A:
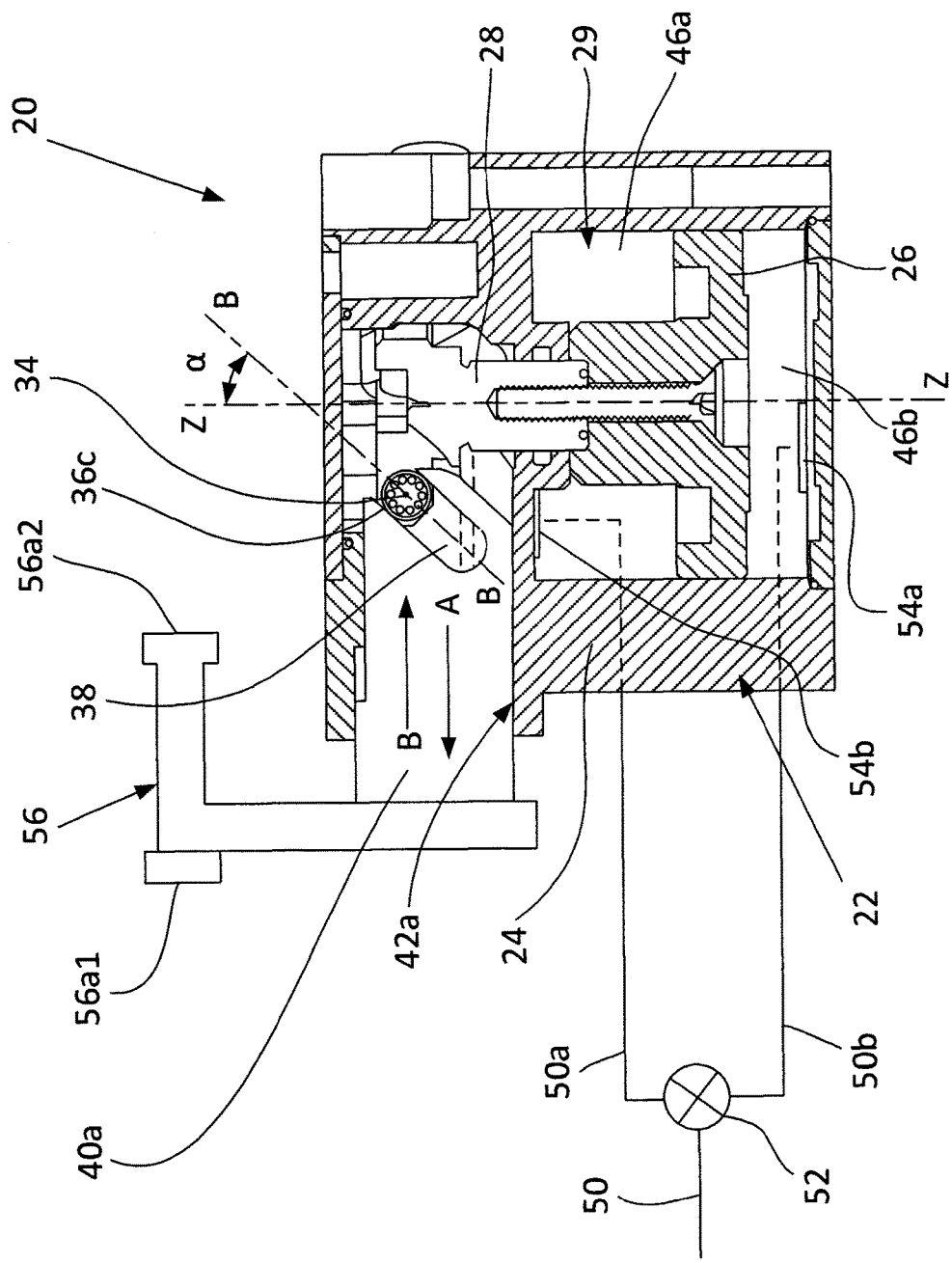
FIG. 2A is a side sectional view along line II-II of FIG. 1 that illustrates the structure of the gripper mechanism actuator.
Figure 2B:
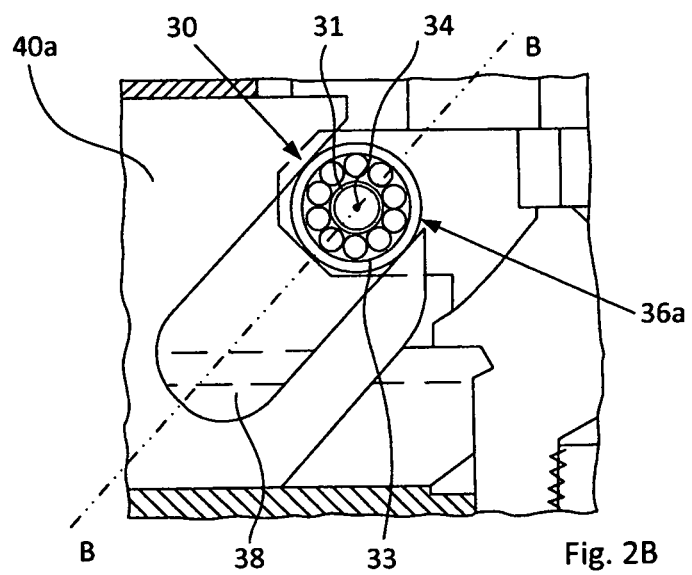
FIG. 2B is an enlarge view of a fragment of FIG. 2A illustrating attachment and position of a ball bearing that slides and rolls inside the inclined slot.
Figure 3:
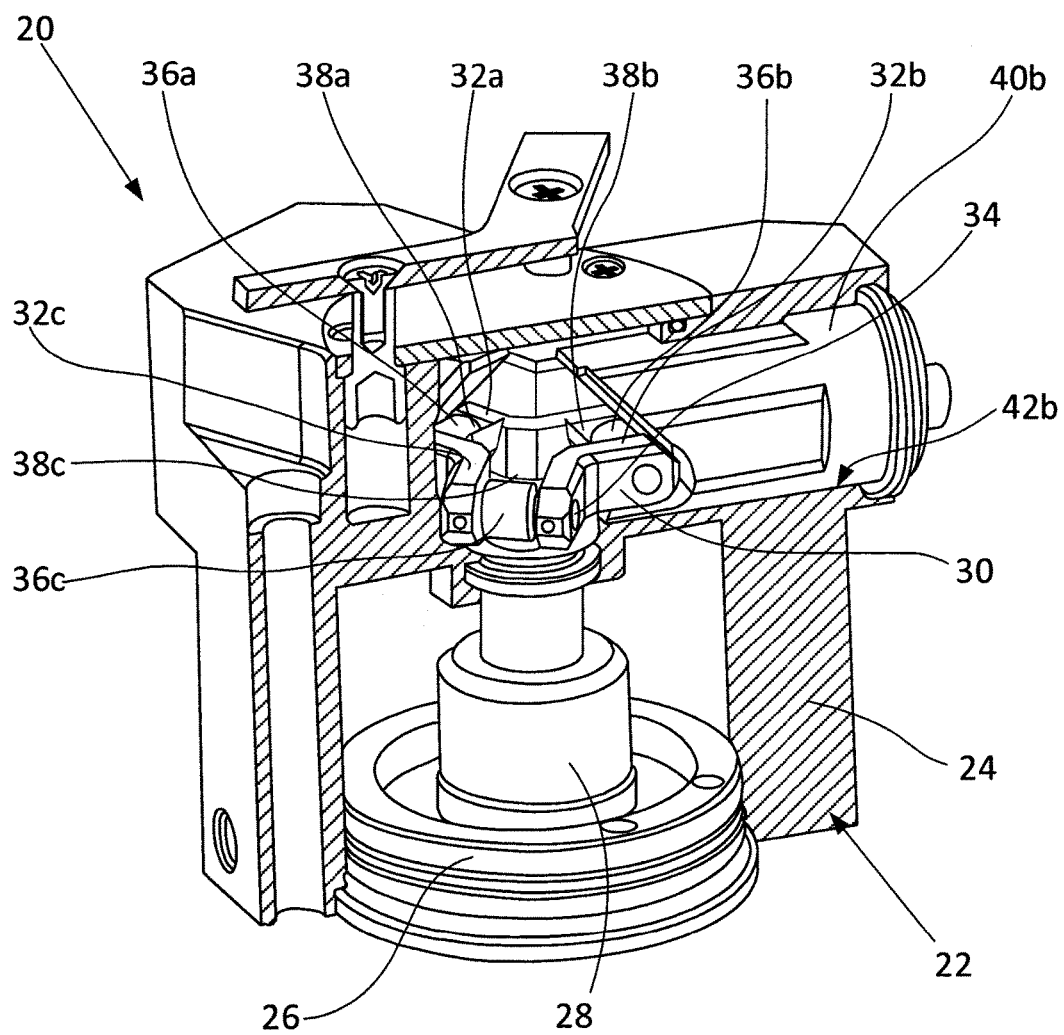
FIG. 3 is a three-dimensional view of the mechanism of the invention with a part of the mechanism cut along line III-III and removed in the direction of arrows for exposing the arrangement of the gripper mechanism actuator.

The gripper mechanism of the present invention is shown in the attached drawings, wherein FIG. 1 is a top view of the industrial gripper mechanism of the present invention without the gripper jaws, FIG. 2A is a side sectional view along line II-II of FIG. 1 that illustrates structure of the gripper mechanism actuator, FIG. 2B is an enlarge view of a fragment of FIG. 2A illustrating a position of the bearing, and FIG. 3 is a three-dimensional view of the mechanism of the invention with a part of the mechanism cut along line III-III and removed for exposing the arrangement of the gripper mechanism actuator.

As shown in the drawings, the industrial gripper mechanism of the invention, which hereinafter is referred to merely as a gripper mechanism and which is designated in its entity by reference numeral 20, has a housing 22 with radial outward projection parts 22a, 22b, and 22c, which are equally spaced from each other in the circular direction (FIG. 1). In fact, the number of radially extending parts of the housing 20 correspond to the number of gripper elements to be used for gripping the objects (not shown) from outside or inside, depending on the direction of the gripping action of the gripper device 20.

Since the structure of the mechanism in the sectional view along each outward projection part is the same, hereinafter only one such structure, i.e., the structure shown in FIG. 2A or the structure shown in FIG. 3, will be further considered in detail. In other words, in some places of the specification some components will be described and considered in a singular form instead of plural.

Thus, the housing 22 of the gripper mechanism 20 contains a fluid cylinder, e.g., a pneumatic cylinder 24 with a piston 26 having a piston rod 28, which extends from the cylinder interior 29 into the housing 22 and supports a bearing holder 30 (FIG. 3). In the illustrated modification of the gripper mechanism 20, the bearing holder 30 is made in the form of a three-ray star with radial arms 32a, 32b, and 32c (FIG. 3) that support axles (such as an axle 34), which support rolling members, which can slide and roll in inclined slots, such as a slot 38 (FIGS. 2A and 2B) formed in gripper jaw holders (only two of which, i.e., gripper jaw holders 40a and 40b are shown), which are slidingly fitted in radial guides (42a, 42b) of the housing 22. In the example shown in FIG. 2B the rolling members are shown as ball bearings 36a, 36b, and 36c having their inner rings, such as a ring 31 secured on the axle 34. The outer rings, such as rings 33 (FIG. 2B) of the ball bearings 36a, 36b, and 36c, are slidingly fitted in inclined slots, such as a slot 38 (FIGS. 2A and 2B) formed in gripper jaw holders (only two of which, i.e., gripper jaw holders 40a and 40b are shown), which are slidingly fitted in radial guides (42a, 42b) of the housing 22. The outer ring rings, not only slides but also rolls in the inclined slots.

The longitudinal axis B-B of the inclined slot 38 is inclined relative to the longitudinal axis Z-Z of the piston 26 and the piston rod 28 at an angle α, which may vary in the range of 10° to 55°, preferably in the range of 15° to 45°. If the angle is less than 10°, this may lead to wedging of the actuator, and if the angle exceeds 55°, this will lead to increase in the transverse dimensions of the gripper mechanism 20.

The piston 26 divides the piston cylinder interior 29 into an upper cavity 46a formed above the piston 26 and a lower cavity 46b formed under the piston 26 (FIG. 2A). These cavities are connected to a compressed air supply line 50 by channels 50a and 50b via a reversible controllable switch valve 52, e.g., an electronically controllable solenoid valve, and through respective air feed ports 54a and 54b (FIG. 2A).

Reference numeral 56 designates a gripper jaw (although only one such gripper jaw is shown, the number of jaws corresponds to the number of gripper jaw holders), which is attached to the end face of each the jaw holder 34a. There are three such jaws are used in the modification of the gripper device 20 shown and described herein. The gripper jaw 56 is shown very schematically, and in reality the gripper jaw 56a may have different shapes and configurations. For example, the gripper jaw 56a may have a universal application with a contact element 56a1 intended for gripping an object (not shown) from inside by contacting the inner periphery of an opening, and the contact element 56a2 intended for grapping an object by contacting its outer surface. The gripper jaws may be replaceable or repositionable and can provide radial inward and radial outward gripping action.

On its way up and down, the piston 26 alternatively admits compressed air into cavities under and above the piston.

The electronically controlled three-way solenoid valve 52 is a standard commercially produced device and may be represented, e.g., by Solenoid Air Valve, 3-Way, 120 VAC, 1-20 psi produced by Siemens (Zoro #: G8527522|Mfr #: 265-1028), or the like.

In operation, when compressed air is supplied from the air-supply line 50 via the channels 50b or 50a into the under-piston cavity 46b or the over-piston cavity 46a, the piston 26 together with the bearing holder and the ball bearings 38a, 38b, and 38c moves up. Movement of the bearings 38a, 38b, and 38c in the inclined slots, such as the slot 38, forces the jaw holders (only two of which 40a and 40b are shown) to slide in the outward radial direction (shown by arrow A in FIG. 2A) in the housing 22 thus moving the gripping jaws, such as the gripper jaw 56) in the same direction relative to the object to be gripped (not shown).

When the piston 26 is in the position for the movement in the downward direction, the compressed air is supplied to the over-piston cavity 46a, the piston 26 moves down, and the bearings 38a, 38b, and 38c, which also move down, push the gripping-jaw holders in the radial inward direction indicated by the arrow B (FIG. 2A)

Thus, the gripper mechanism 20 provides a positive gripping action in both directions without the use of a spring for a return stroke of the grippers. The mechanism 20 provides the gripper jaws with sufficient rigidity, high and a controllable gripping forces, and accurate precision movements.

Alternatively, the gripper mechanism 20 of the invention can be presented as device comprising: a housing 22; a first body 26, 28 movable in a first direction (axis Z-Z); a plurality of second bodies 50a, 40b movable in directions of arrows A, B perpendicular to the first direction (axis Z), wherein each second body has a first end that carries a gripper jaw 56 and the second end that has a slot 38 inclined to the first direction; and plurality of rolling bearings 36a, 36b, and 36c, each one is slidingly fitted in one of the slots and connected to the first body for joint movement therewith. The gripper mechanism 20 is further provided with a drive mechanism for the first body in the form of a pneumatic cylinder with a piston, where the piston comprises the aforementioned first body 56.

During movement of the piston 26 with the piston rod 28, the rolling bearings such as ball bearings 36a, 36b, and 36b, which are carried by the bearing holder 30 (FIG. 3), move in the first direction, i.e., in the direction of the axes Z within the respective slots, such as the slot 38, and thus exert the wedging or camming action on the walls of the slots forcing the second members, i.e., gripper jaw holders, radially outwards or inward relative to the housing 22, whereby the gripper jaws, which are supported by the gripper jaw holders, perform forced object gripping or object releasing movements.

Figure 2C:
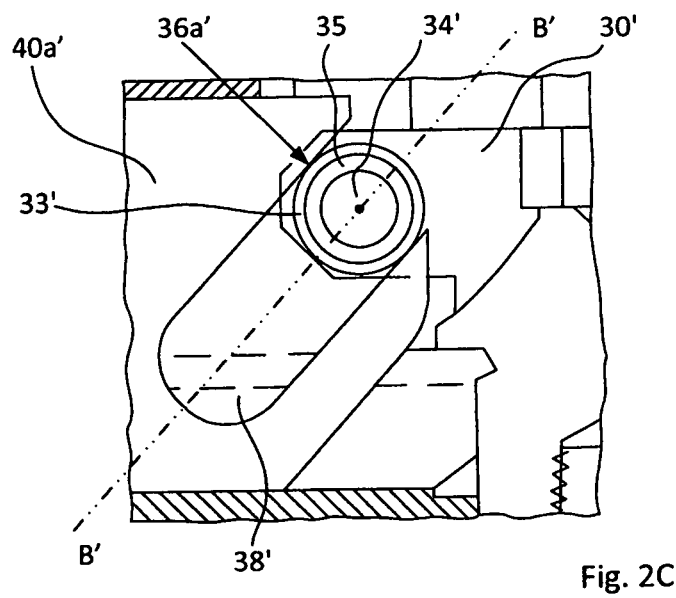
FIG. 2C is an enlarge view of a fragment of FIG. 2A illustrating attachment and position of a plain ball bearing that slides and rolls inside the inclined slot.

FIG. 2B is an enlarge view of a fragment of FIG. 2A that illustrate a rolling member 36a', which rolls and slides in the inclined slot 38 in the form of a ball bearing 36a. However, the rolling member which rolls and slides in the inclined slot may comprise a plain bearing, such as a plain bearing 36a' in an inclined slot 38' shown in FIG. 2C. Since all other components of this unit are the same as in the case of the ball bearings, they are designated in FIG. 2C with the same reference numerals with an addition of a prime ('). The plain bearing 36a' consists of an outer ring 33' and a sleeve 35, which is made from an anti-friction material, e.g., a bronze. The sleeve 35 is press-fitted into the outer ring 33' and is slidingly fitted onto the axle 34' so that during movement of the jaw holder 30' together with axle 34', the outer ring 36a' slides and rolls over the surfaces of the inclined slot 38'.

Although the invention has been shown and described with reference to specific embodiments, it is understood that these embodiments are given only as examples and that any changes and modifications are possible within the scope of the attached claims. For example, the ball bearings can be replaced by roller bearings, needle bearings, or any other rolling bearing. The bearing holder may have any other suitable shape and structure, and two or more than three gripper holders and gripper jaws may be used. A pneumatic cylinder can be replaced by hydraulic. The extreme positions of the gripper holders and electronic control of the solenoid valve for reversing the gripper movements can be carried out by using optical sensors.

The invention claimed is:

1. An industrial wedge-type gripper mechanism comprising:
    a housing that contains a fluid cylinder having a cylinder interior and piston with a piston rod that extends from the cylinder interior into the housing, wherein the piston and the piston rod have a longitudinal axis, moves in the cylinder interior and divides the cylinder interior into an over-piston chamber and an under-piston chamber;
    a fluid supply source, a first fluid port for supplying a fluid from the fluid supply port to the under-piston chamber, a second fluid port for supplying the fluid from the fluid supply port to the over-piston chamber, and a reversible controllable switch valve for switching the supply of the fluid between the first fluid port and the second fluid port;
    a plurality of through guide channels which are formed in the housing, extend in the radial direction, and are unfirmly spaced in the circumferential direction;
    gripper jaw holders having front ends and rear ends, the gripper jaw holders being slidingly fitted, each one in each guide channel;
    a plurality of inclined slots having longitudinal axes formed in the rear ends of the gripper jaw holders, each one in each gripper jaw holder, the longitudinal axes of the inclined slots being inclined to the longitudinal axis of the piston and the piston rod at an angle α;
    a bearing holder rigidly connected to the piston rod;
    a plurality of rolling members rotatingly supported by the bearing holder and rolling in the inclined slots, each one in each inclined slot; and
    a plurality of gripper jaws attachable to the front ends of the gripper jaw holders, each one to each gripper jaw holder.

2. The industrial wedge-type gripper mechanism according to claim 1, where the fluid is air.

3. The industrial wedge-type gripper mechanism according to claim 2, wherein the reversible controllable switch valve is an electromagnetic valve.

4. The industrial wedge-type gripper mechanism according to claim 1, wherein the rolling members are selected from rolling bearings and plain bearings.

5. The industrial wedge-type gripper mechanism according to claim 4, where the fluid is air.

6. The industrial wedge-type gripper mechanism according to claim 5, wherein the reversible controllable switch valve is an electromagnetic valve.

7. The industrial wedge-type gripper mechanism according to claim 1, wherein the angle α ranges from 10° to 55°.

8. The industrial wedge-type gripper mechanism according to claim 7, wherein the rolling members are selected from rolling bearings and plain bearings.

9. The industrial wedge-type gripper mechanism according to claim 8, where the fluid is air.

10. The industrial wedge-type gripper mechanism according to claim 9, wherein the reversible controllable switch valve is an electromagnetic valve.

11. The industrial wedge-type gripper mechanism according to claim 1, wherein each rolling bearing has an inner ring and an outer ring, the bearing holder has a plurality of axles for securing the inner rings of the roller bearings, and outer rings are sidingly fitted in the inclined slots.

12. The industrial wedge-type gripper mechanism according to claim 11, wherein the rolling bearings are ball bearings.

13. The industrial wedge-type gripper mechanism according to claim 12, where the fluid is air.

14. The industrial wedge-type gripper mechanism according to claim 13, wherein the reversible controllable switch valve is an electromagnetic valve.

15. The industrial wedge-type gripper mechanism according to claim 14, wherein the angle α ranges from 10° to 55°.

* * * * *